US009415776B2

(12) United States Patent
Schwindt et al.

(10) Patent No.: US 9,415,776 B2
(45) Date of Patent: Aug. 16, 2016

(54) ENHANCED LANE DEPARTURE SYSTEM

(71) Applicant: Robert Bosch GmbH, Stuttgart (DE)

(72) Inventors: Oliver Schwindt, Palo Alto, CA (US);
James Kim, Royal Oak, MI (US);
Bhavana Chakraborty, Novi, MI (US);
Kevin Buckner, Macomb, MI (US);
Brad Ignaczak, Canton, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/529,983

(22) Filed: Oct. 31, 2014

(65) Prior Publication Data
US 2015/0183430 A1    Jul. 2, 2015

Related U.S. Application Data

(63) Continuation of application No. PCT/US2014/053714, filed on Sep. 2, 2014.

(60) Provisional application No. 61/874,215, filed on Sep. 5, 2013.

(51) Int. Cl.
*B60W 30/09* (2012.01)
*B60W 30/12* (2006.01)
*B60W 50/14* (2012.01)

(52) U.S. Cl.
CPC .............. *B60W 30/09* (2013.01); *B60W 30/12* (2013.01); *B60W 2050/143* (2013.01); *B60W 2420/52* (2013.01); *B60W 2550/00* (2013.01); *B60W 2550/30* (2013.01); *B60W 2710/202* (2013.01)

(58) Field of Classification Search
CPC ............................. B60W 30/09; B60W 30/12
USPC ............................................................. 701/23
See application file for complete search history.

(56) References Cited

U.S. PATENT DOCUMENTS

| 4,349,823 | A | 9/1982 | Tagami et al. | |
|---|---|---|---|---|
| 7,378,947 | B2 | 5/2008 | Daura Luna et al. | |
| 7,411,486 | B2 | 8/2008 | Gern et al. | |
| 7,504,986 | B2 | 3/2009 | Brandt et al. | |
| 7,561,032 | B2 * | 7/2009 | Huang | B62D 15/029 340/435 |
| 7,679,498 | B2 | 3/2010 | Pawlicki et al. | |
| 7,710,291 | B2 * | 5/2010 | Kim | B60R 1/00 340/435 |
| 7,765,066 | B2 | 7/2010 | Braeuchle et al. | |
| 8,219,298 | B2 | 7/2012 | Nishira et al. | |
| 8,405,522 | B2 | 3/2013 | Shaffer et al. | |
| 8,466,806 | B2 | 6/2013 | Schofield | |
| 8,493,195 | B2 | 7/2013 | Lee | |
| 8,594,890 | B2 * | 11/2013 | Imai | B60W 30/12 180/167 |

(Continued)

FOREIGN PATENT DOCUMENTS

| EP | 0952459 | 10/1999 |
|---|---|---|
| JP | 2005182198 | 7/2005 |
| WO | 90/13103 | 11/1990 |

*Primary Examiner* — Mussa A Shaawat
*Assistant Examiner* — Michael Berns
(74) *Attorney, Agent, or Firm* — Michael Best & Friedrich LLP

(57) ABSTRACT

A lane departure monitoring system uses a forward sensor to determine a lane position of a host vehicle and to detect oncoming vehicles. Rear side sensors monitor the side blindspots of the host vehicle as well as vehicles in the adjacent lanes that are approaching from the rear. A control system combines the information provided by these sensors and runs integrated programs to carry out a method for providing lane keeping assist and lane departure warnings.

17 Claims, 4 Drawing Sheets

(56) References Cited

U.S. PATENT DOCUMENTS

| | | | |
|---|---|---|---|
| 9,051,008 B2 * | 6/2015 | Schiehlen | B62D 15/025 |
| 2006/0250224 A1 | 11/2006 | Steffel et al. | |
| 2008/0024284 A1 * | 1/2008 | Baratoff | G08G 1/161 |
| | | | 340/435 |
| 2008/0033614 A1 * | 2/2008 | Schiehlen | B62D 15/029 |
| | | | 701/41 |
| 2010/0171641 A1 | 7/2010 | Raphael et al. | |
| 2010/0182139 A1 * | 7/2010 | Chen | B62D 15/029 |
| | | | 340/435 |
| 2010/0295707 A1 | 11/2010 | Bennie et al. | |
| 2012/0109521 A1 | 5/2012 | Rothschild | |
| 2012/0154135 A1 * | 6/2012 | Tronnier | B60W 30/18163 |
| | | | 340/435 |
| 2012/0206252 A1 * | 8/2012 | Sherony | B60W 30/12 |
| | | | 340/438 |
| 2012/0212353 A1 | 8/2012 | Fung et al. | |
| 2013/0187793 A1 | 7/2013 | Katayama | |

\* cited by examiner

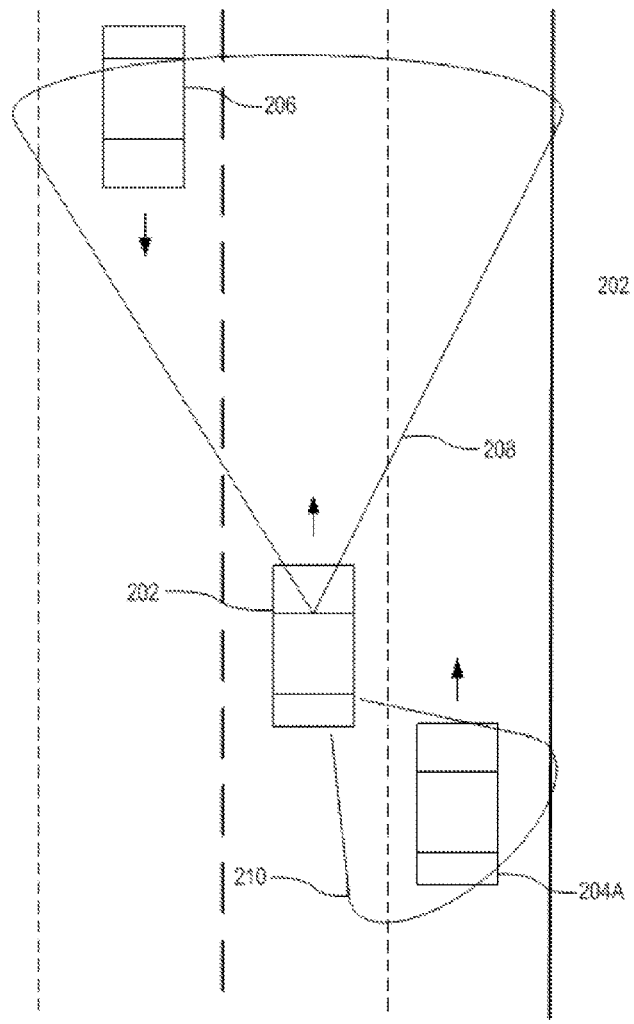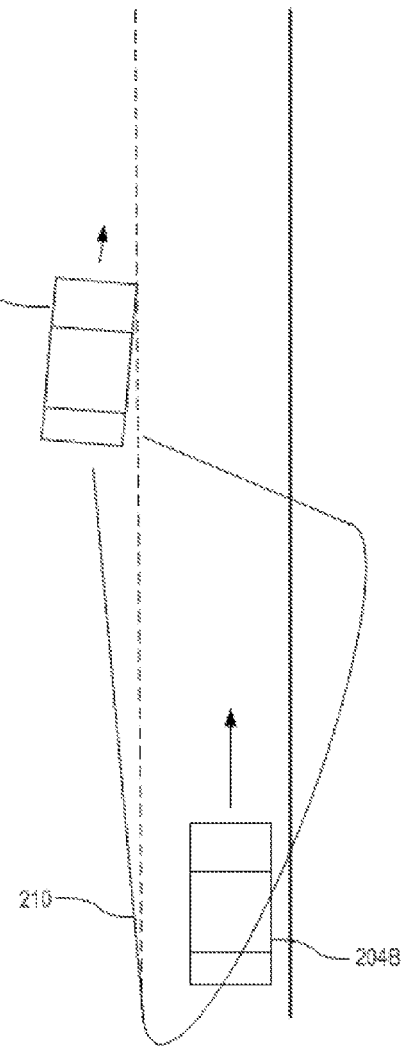

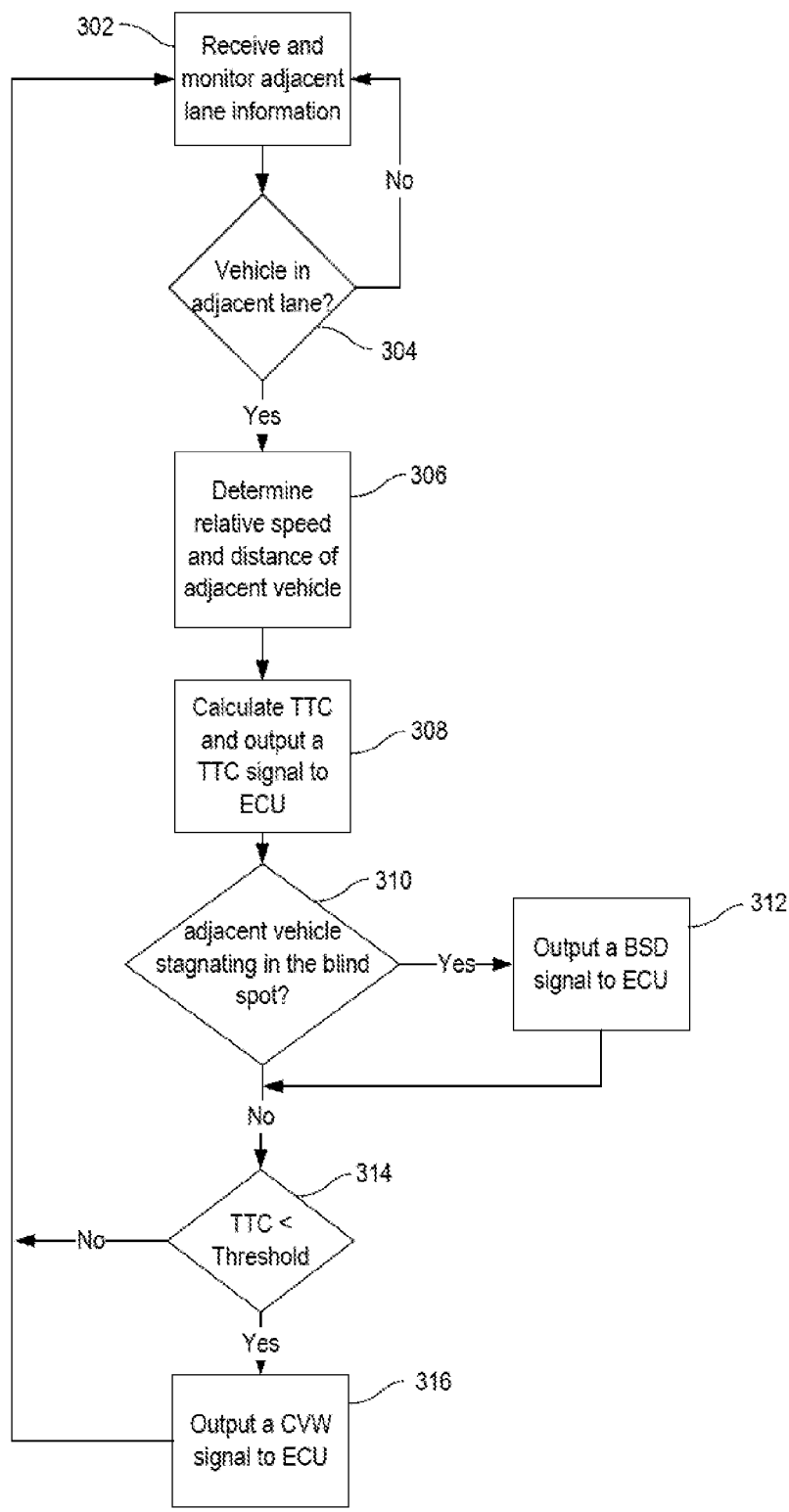

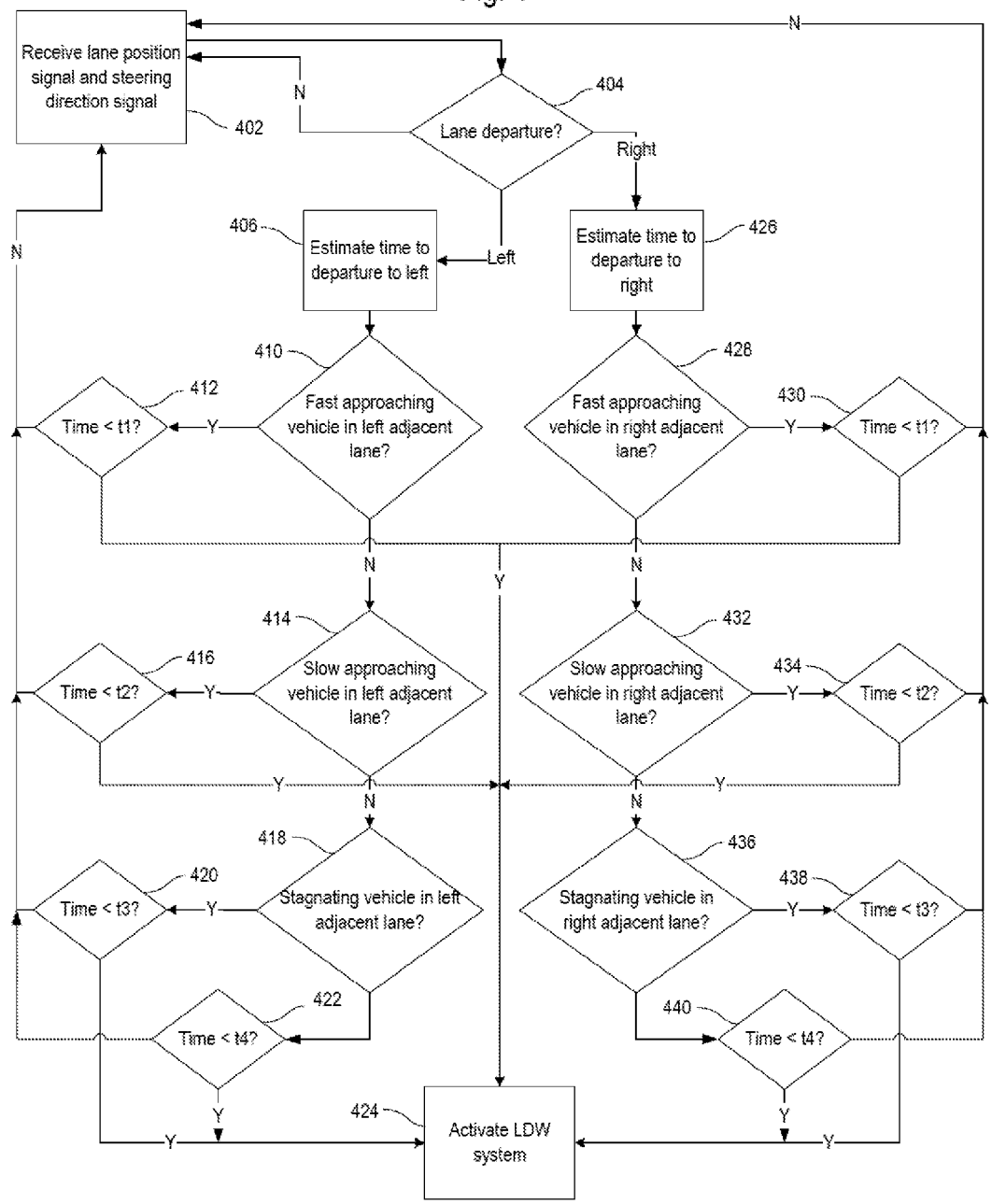

ENHANCED LANE DEPARTURE SYSTEM

BACKGROUND

The present invention relates to systems and methods for providing assistance in operating a vehicle.

SUMMARY

In various constructions of the invention described below, vehicles may be equipped with systems that detect the vehicle's departure from a lane of traffic. Such systems may provide a warning to the driver if the vehicle is exiting the lane. Furthermore, some systems may provide active lane assistance to intervene in the operation of the vehicle steering system to ensure that the vehicle remains in its current lane. Various embodiments described herein use a multi-system approach to provide for an integrated and quick response to such conditions.

In one embodiment, the invention provides a system for lane departure monitoring, warning, and correction. The system uses a first sensor positioned on a host vehicle to monitor lane markings and oncoming traffic. One or more additional sensors are positioned with a field of view that includes at least a portion of a side blind-spot of the host vehicle. One or more control systems (e.g., electronic control units) include at least one processor and one memory to control the operation of the sensors and the lane departure monitoring system. The control system receives a signal from the first sensor indicating the position of the lane markings relative to the host vehicle. The control system determines, based on a first signal from the first sensor, whether the host vehicle is likely to cross a lane boundary (i.e., about to cross a lane marking). Additionally, the control system determines whether a second vehicle is present in a lane adjacent to the host vehicle, and the control system determines the distance and the relative velocity of the second vehicle.

Based on the distance and the relative velocity of the second vehicle, the control system determines a risk of collision and adjusts a time for taking action. The system is designed to respond more quickly when the risk of collision is greater. The control system determines whether or not the second vehicle is fast approaching from the front or from the rear. When the control system determines that the host vehicle is likely to cross a lane boundary and the second vehicle is fast approaching the host vehicle, the control system outputs an action signal at a first time (i.e., the fastest response). When the control system determines that the host vehicle is likely to cross a lane boundary and the second vehicle is approaching, but not fast approaching, the control system outputs the action signal at a second time. When the control system determines that the second vehicle is stagnating (i.e., operating at a constant speed that is substantially the same as the speed of the host vehicle) in the side blind-spot, the control system outputs an action signal at a third time. When the control system determines that there is no second vehicle present in the lane adjacent to the host vehicle, the control system outputs an action signal at a fourth time.

In another embodiment the invention provides a method of lane departure monitoring, warning, and correction. A first sensor is positioned on a host vehicle with a field of view that includes lane markings and a second sensor is positioned on the host vehicle with a field of view that includes the side blind-spot of the host vehicle. The first sensor receives a signal that indicates the position of the lane markings relative to the host vehicle. The first signal indicates whether the host vehicle is likely to cross a lane boundary. The second sensor indicates whether a second vehicle is present in the lane adjacent to the host vehicle. A distance and a relative velocity are determined for the second vehicle.

This embodiment further includes determining whether the second vehicle is stagnating in the side blind-spot or approaching the host vehicle based on the distance and the relative velocity of the second vehicle. An action signal is sent, at a first time, when the host vehicle is likely to cross a lane boundary and the second vehicle is fast approaching the host vehicle. An action signal is sent, at a second time (longer than the first time), when the host vehicle is likely to cross a lane boundary, and the second vehicle is present, but not fast approaching. In other examples, an action signal is sent at a third time (longer than both the first time and the second time) when the second vehicle is stagnating in the side blind-spot. Additionally, when the host vehicle is likely to cross a lane boundary and when there is no second vehicle in the lane adjacent, an action signal is sent at a fourth time (longer than the first time, the second time, and the third time).

Other aspects of the invention will become apparent by consideration of the detailed description and accompanying drawings.

BRIEF DESCRIPTION OF THE DRAWINGS

FIG. 2A is an overhead view of a host vehicle operating in a first traffic scenario.

FIG. 2B is an overhead view of the host vehicle operating in a second traffic scenario.

FIG. 3 is a flowchart of a method for detecting, identifying, and transmitting information about an adjacent vehicle implemented by the system of FIG. 1.

FIG. 4 is a flowchart of a method for activating an action signal for lane departure warning system in the system of FIG. 1.

DETAILED DESCRIPTION

Figure 1:
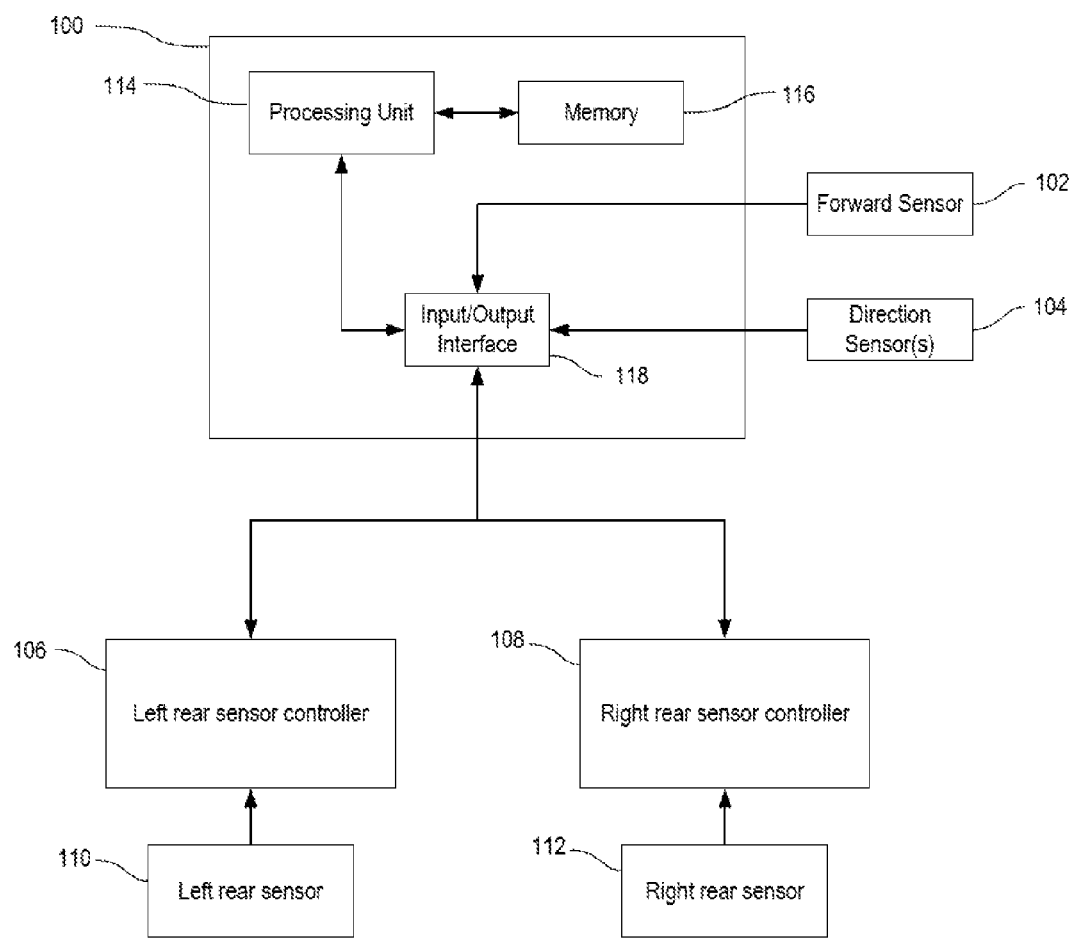
FIG. 1 is a block diagram of a lane departure system according to one construction.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

FIG. 1 illustrates a system that includes an electronic control unit 100 (ECU) electrically connected to a forward sensor 102, one or more direction sensors 104, a left rear sensor controller 106, and a right rear sensor controller 108. The left rear sensor controller 106 is further electrically connected to a left rear sensor 110, and the right rear sensor controller 108 is further connected to a right rear sensor 112. The direction sensor 104 may include a steering wheel sensor (e.g., a steering wheel position sensor), a steering wheel torque sensor, a front wheel position sensor, or a combination of sensors that detect the direction of the host vehicle. The ECU 100, the left rear sensor controller 106, and the right rear sensor controller 108 are connected via a vehicle communication system including, for example, a controller area network (CAN bus) or a dedicated wire. The left rear sensor controller 106 and the right rear sensor controller 108 send control information to the ECU 100 including a blind-spot detection signal (BSD), a closing vehicle warning signal (CVW), and a time-to-collision signal (TTC). The ECU 100 includes combinations of hardware and software that, among other things, control the operation of the lane departure system.

In some embodiments, the ECU 100 includes a plurality of electrical and electronic components that provide power, operational control, and protection to the components and modules within the ECU 100. The ECU 100 includes, among other things, a processing unit 114 (e.g., a microprocessor or another suitable programmable device), a memory 116, and an input/output interface 118. The processing unit 114, the memory 116, and the input/output interface 118, as well as the other various modules are connected by one or more control or data buses. The use of control and data buses for the interconnection between and communication among the various modules and components would be known to a person skilled in the art in view of the invention described herein. In some embodiments, the ECU 100 is implemented partially or entirely on a semiconductor (e.g., a field-programmable gate array ["FPGA"] semiconductor) chip.

The memory 116 includes a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 114 is connected to the memory 116 and executes software instructions that are capable of being stored in a RAM of the memory 116 (e.g., during execution), a ROM of the memory 116 (e.g., on a generally permanent basis), or another non-transitory computer readable medium. Software included for the processes and methods for the lane departure system can be stored in the memory 116 of the ECU 100. The software can include firmware, one or more applications, program data, filters, rules, one or more program modules, and other executable instructions. For example, the ECU 100 effectively stores information relating to detection and determination of lane markings. The processing unit 114 is configured to retrieve from memory 116 and execute, among other things, instructions related to the control processes and methods described herein. In other constructions, the ECU 100 includes additional, fewer, or different components.

The left rear sensor controller 106 and the right rear sensor controller 108 can include all or some of the components of the ECU 100 as described above. In the example shown in FIG. 1, the left rear sensor controller 106 and the right rear sensor controller 108 perform various processes and methods involving the left rear sensor 110 and the right rear sensor 112. In other embodiments, the ECU 100 communicates directly with the left rear sensor 110 and the right rear sensor 112 without any left rear sensor controller 106 or right rear sensor controller 108. In these embodiments, the processes or methods involving the left rear sensor 110 and the right rear sensor 112 are performed by the ECU 100. In some embodiments, the left rear sensor 110 and the right rear sensor 112 use radar signals and radar pulses.

FIG. 2A illustrates a first traffic scenario encountered by a host vehicle 202 equipped with a forward sensor 102 and a right rear sensor 112. An adjacent vehicle 204A is operating in a lane next to the host vehicle 202 and traveling in the same direction at substantially the same speed as the host vehicle 202 as indicated by the direction and length of the forward arrows. A third vehicle 206 (e.g., an oncoming vehicle) is approaching the host vehicle and traveling in the opposite direction (again as indicated by the direction and magnitude of the arrow).

Angled lines emanating from the host vehicle 202 illustrate the forward field of view 208 of the forward sensor 102 and the right-facing field of view 210 of the right rear sensor 112. It is noted that the forward field of view 208 and the right-facing field of view 210 as illustrated are examples and do not necessarily illustrate the actual scope or range of the fields of view. The forward sensor 102 detects the position of the host vehicle 202 within a current lane of traffic based on the lane markings on the road. In another embodiment, when the lane markings are not visible, the forward sensor detects the position of the host vehicle 202 as well as the driving lane based the position of vehicles in the driving lane and the adjacent lanes. This allows the ECU 100 to determine a lane departure based either on lane markings or on adjacent vehicles. A lane departure can be intentional as in the case of a driver performing a lane change or cutting a corner, or a lane departure can be unintentional, as in the case of an inattentive driver.

If the host vehicle 202 is going to depart from its lane, two hazardous conditions may arise. The first hazardous condition involves the host vehicle 202 moving into the right adjacent lane when an adjacent vehicle 204A is stagnating in a right blind-spot of the host vehicle 202. The right rear sensor 112 and the right rear sensor controller 108 are positioned and programmed to detect the adjacent vehicle 204A. As described in further detail below, in this situation, the right rear sensor controller 108 determines that the adjacent vehicle 204A is stagnating in the right blind-spot of the host vehicle 202 and outputs a BSD signal. The ECU 100 receives the BSD signal and, based on an estimated time of lane departure, outputs the action signal. The right rear sensor controller 108 may be configured to detect the adjacent vehicle 204A based on a variety of positions for the adjacent vehicle 204A (e.g., completely in the side blind-spot, partially in the side blind-spot, or near to the side blind-spot). However, if the adjacent vehicle 204A is stagnating in the blind spot of the host vehicle 202, but is far enough behind the host vehicle 202 that a collision will not occur, then the hazard posed by the adjacent vehicle 204A is minimal.

The second hazardous condition involves the host vehicle 202 drifting into the left adjacent lane when the third vehicle 206 is approaching in the left adjacent lane. In one construction, the forward sensor 102 senses the third vehicle 206 from the front in an adjacent lane to the host vehicle 202. This construction uses a forward-facing video camera included in the forward sensor 102, and an ECU 100 programmed to identify oncoming vehicles from a stream of video information from the video camera. The ECU 100 is programmed to process the stream of video information to detect both the distance and the relative speed of the third vehicle 206 adjacent to and forward from the host vehicle 202. Based on the distance and relative speed, the ECU 100 calculates a time-to-collision (i.e., the time remaining until the host vehicle 202 and an approaching vehicle collide based on their current speed if they steer towards each other). If the time-to-collision of the third vehicle 206 is below a threshold, the ECU sets a fast approaching vehicle indication. If the time-to-collision of the third vehicle 206 is above a threshold, the ECU sets a slow approaching vehicle indication. Based on the fast approaching vehicle indication and the slow approaching vehicle indication, the ECU outputs an action signal as shown in FIG. 4. Additionally, the ECU 100 uses the forward sensor 102, the left rear sensor 110, and the right rear sensor 112 to identify the presence of stationary objects such as parked cars, highway infrastructure, and large objects and outputs the action signal under similar conditions as if the stationary objects were vehicles.

FIG. 2B illustrates a different driving scenario involving the host vehicle 202. In this situation, the adjacent vehicle 204B is operating in an adjacent lane and is travelling at a faster speed than the host vehicle 202 as indicated by a longer length forward arrow. As such, the adjacent vehicle 204B is approaching the host vehicle. The field of view of the right rear sensor 112 extends from the right blind-spot of the host vehicle 202 rearward, and therefore, covers much of the right adjacent lane of the host vehicle 202. This allows the right rear sensor controller 108 to identify a hazardous condition involving the host vehicle 202 moving into the right adjacent lane when the approaching vehicle 204B is in the right adjacent lane. The right rear sensor controller 108 determines the relative speed between the host vehicle 202 and the approaching vehicle 204B. Additionally, based on the relative speed, the right rear sensor controller 108 calculates a time-to-collision between the host vehicle 202 and the approaching vehicle 204B. The right rear sensor controller 108 outputs a time-to-collision signal to the ECU 100. When the time-to-collision is below a set threshold, the right rear sensor controller 108 also outputs a CVW signal to the ECU 100.

It is noted that, although the right rear sensor 112 is illustrated proximal to the right rear of the host vehicle 202 in the examples of FIGS. 2A and 2B, in other constructions, the right rear sensor 112 and the left rear sensor 110 are located in other locations on the host vehicle 202. For example, the right rear sensor 112 and the rear left sensor can be located proximal to the side mirrors of the host vehicle 202. The forward sensor 102 is illustrated inside the windshield of the host vehicle 202. In still other constructions, the forward sensor 102 is located on the exterior of the host vehicle 202. Additionally, the forward sensor 102 may be positioned downward instead of forward while maintaining a field of view of the lane markings.

The flowchart of FIG. 3 illustrates a closing vehicle warning method that is implemented by the right rear sensor 112 and the right rear sensor controller 108. Although not illustrated, a similar method is implemented by the left rear sensor 110 and the left rear sensor controller 106. The right rear sensor controller 108 monitors and receives information from the right rear sensor 112 (step 302). When the right rear sensor controller 108 detects an approaching vehicle in the adjacent lane (step 304), the right rear sensor controller 108 determines the distance and the speed of the approaching vehicle relative to the host vehicle (step 306). The right rear sensor controller 108 then calculates a time-to-collision (TTC) between the host vehicle 202 and the detected adjacent vehicle and outputs a TTC signal to the ECU 100 (step 308). The right rear sensor controller 108 determines whether an adjacent vehicle is located in the right blind-spot of the host vehicle 202 (step 310), and if so, the right rear sensor controller 108 outputs a BSD signal to the ECU 100 (step 312). If the TTC is less than the time threshold (step 314), the right rear sensor controller 108 outputs a CVW signal to the ECU 100 (316).

FIG. 4 illustrates how the ECU responds to the signals received from the right rear sensor controller 108, the left rear sensor controller 106, and the forward sensor 102, and how the ECU 100 controls the vehicle system in response. Even though FIG. 4 illustrates an order of steps, the steps can be performed in an alternate order. For example, the ECU 100 may determine if a slow approaching vehicle is in the left adjacent lane before the ECU 100 determines if a fast approaching vehicle is in the left adjacent lane. The ECU 100 receives a signal indicative of a lane position from the forward sensor 102 and a signal indicative of a steering direction from the direction sensor 104 (step 402). The ECU 100, based on these signals, predicts if the host vehicle 202 is likely to cross a lane boundary and whether the departure will be towards the left or towards the right (step 404). The ECU 100 estimates the time to the lane departure (step 406) (i.e., a lane boundary crossing time).

The ECU 100 monitors an input from the left rear sensor controller 106 (e.g., the BSD, CVW, and TTC value (if any)) and characterizes the nature of the collision hazard. If the CVW signal indicates that an adjacent vehicle is approaching in the left adjacent lane and the TTC value is below a set threshold, then the ECU 100 determines that there is a fast approaching vehicle in the left lane (step 410). If the CVW signal indicates that an adjacent vehicle is approaching in the left adjacent lane and the TTC value is above the set threshold, then the ECU 100 determines that a "slow approaching vehicle" is present in the left lane (step 414). Similarly, the ECU 100 monitors the forward sensor 102 and determines if a fast approaching or slow approaching vehicle is present in the left adjacent lane in the forward direction (steps 410, 414).

If a "fast approaching vehicle" is present in the left lane, then the ECU 100 waits until the time to lane departure is below a first time threshold (t1) (step 412) and then activates the lane departure warning system (step 424). If a "slow approaching vehicle" is present in the left lane, then the ECU 100 waits until the time to lane departure is below a second time threshold (t2) (step 412) before activating the lane departure warning system (step 424). Because the fast approaching vehicle scenario poses a more urgent hazard, the first time threshold is higher than the second time threshold. As a result, the lane departure warning system is activated earlier when a fast approaching vehicle is present.

Some constructions of the lane departure warning system only include the two time thresholds/hazard conditions described above (i.e., fast approaching vehicle or slow approaching vehicle). However, as further illustrated in FIG. 4, other systems include additional scenarios in which the lane departure warning system might be activated. For example, the BSD signal may indicate that a vehicle is present in the adjacent lane. However, the TTC may indicate that the vehicle is stagnating. In this situation, there may be no immediate risk of collision. However, the system may still make the driver aware of the close proximity of the adjacent vehicle.

In the example of FIG. 4, the ECU 100 identifies such a scenario as a "stagnating vehicle" in the left adjacent lane (step 418) and activates the lane departure warning system when the time to lane departure is below a third time threshold (t3) (step 420). The lane departure warning system can take the form of a visual indicator, an audible tone, or another type of indication (or combination of multiple forms of indicators). Because a stagnating vehicle in the driver's blind spot may pose no immediate risk of collision, the third time threshold is smaller than both the first and second time thresholds (t1, t2) discussed above. As a result, the lane departure warning system is activated later in the case of a stagnating vehicle.

Lastly, if the BSD signal indicates that there is no vehicle in the blind-spot and the CVW indicates that there is no approaching vehicle, then the ECU 100 only activates the lane departure warning when the time to lane departure is below a fourth time threshold (t4) (step 422). This fourth time threshold (t4) is lower than any of the other time thresholds discussed above and, as a result, the lane departure warning system is activated latest when no adjacent vehicle poses a danger.

The ECU 100 performs a similar process for the right side based on the input from the right rear sensor controller 108. The ECU 100 estimates a time to lane departure into the right adjacent lane (step 426). If a CVW signal from the right rear sensor controller 108 is active and a TTC signal from the right rear sensor controller 108 is low, then the ECU 100 determines that an adjacent vehicle is fast approaching in the right adjacent lane (step 428). If a fast approaching vehicle is present, then the ECU 100 determines if the time to lane departure is less than a first time threshold (t1) (step 430) and activates the lane departure warning system when the time threshold (t1) is passed (step 424). If a slow approaching vehicle is present in the right lane (step 432), then the ECU 100 waits until the time to lane departure is below a second time threshold (t2) (step 434) before activating the lane departure warning system (step 424).

Next, the ECU 100 determines if there is a stagnating vehicle in the right adjacent lane (step 436). If there is a stagnating vehicle, then the ECU 100 determines if the time to lane departure is less than a third time threshold (t3) (step 438). If there is no vehicle detected in the right adjacent that poses a danger, then the ECU 100 activates the lane departure warning system at a time to lane departure less than a fourth time threshold (t4) (step 440).

As discussed above, in some constructions, the time (t1), the time (t2), the time (t3), and the time (t4) are adjustable so that the response of the lane departure system can be tuned. The tuning can be performed during manufacture of the system and, in some constructions, can later be fine-tuned by a user. As a starting point, (t4) can be set to zero for the slowest response to the least dangerous scenario. As such, the lane departure warning system will not be activated until the vehicle actually leaves its lane. Time (t3) is generally greater than time (t4), time (t2) is generally greater than time (t3), and time (t1) is generally greater than time (t2). However, time (t1), time (t2), time (t3), and time (t4) can be set to any values including setting the values equal. Varied time values allows the lane departure warning system to react faster to more hazardous conditions and react slower to less hazardous conditions. Consequently, the lane departure system achieves a fast response while reducing the amount of nuisance lane departure system activations. The order of decisions and processes in FIG. 4 is not critical to the operation and could be performed in an alternate manner.

The ECU 100 outputs the action signal upon detection of a hazardous condition. More specifically, in the example of FIG. 4, the action signal causes the lane departure warning system to be activated, thereby alerting the driver of the host vehicle 202 by using audible, visual, or haptic alerts. However, in some constructions, the action signal causes a lane keeping support system to intervene and to actively control the steering of the vehicle to ensure that it remains in its current operating lane. The control of the steering may be performed by using an electronic stability program (i.e., an electronic stability control) or by using a steering control via an electronic power steering system. In still other constructions, the action signal can cause the vehicle's electronic stability control system to apply selective braking to alter the direction of the host vehicle 202.

Furthermore, in some constructions, the ECU 100 is further configured to differentiate between intentional lane departures and unintentional lane departures. For example, if the turn signal is activated when a potential lane departure is detected, then the ECU 100 concludes that the lane change is intentional. Conversely, if the turn signal is not activated, then the ECU 100 concludes that the lane change is unintentional. The response of the ECU 100 may be altered depending on whether the lane departure is intentional or unintentional. For example, the lane departure warning signal might not be activated for intentional lane departures where there is no adjacent vehicle or only a stagnating adjacent vehicle (with no risk of collision). Similarly, the system may be configured to activate the lane keeping support system in response to unintentional lane departures and to activate the lane departure warning for intentional lane departures.

Lastly, although the examples described above focus on time-based calculations, other constructions may be implemented to focus more on a monitored distance between the host vehicle and the lane boundary. For example, instead of using the direction sensor 104 and vehicle speed to detect a potential lane departure, the system may be configured to monitor changes in the observed distance between the host vehicle and the lane boundary. In such constructions, the acts of receiving direction information (step 402), detecting a potential lane departure (step 404), and estimating a time to departure (steps 406 and 426) might be eliminated. Instead, the system would activate the lane departure warning when varying distance thresholds between the host vehicle and the lane boundary are detected. For example, when a fast approaching vehicle is detected, the lane departure warning system is activated when the distance between the host vehicle and the lane boundary is less than a first distance threshold (d1). When a slow approaching vehicle is detected, the lane departure warning system is activated when a distance between the host vehicle and the lane boundary is less than a second distance threshold (d2) that is smaller than the first distance threshold. When a stagnating vehicle is present, the lane departure warning system is activated when a distance between the host vehicle and the lane boundary is less than a third distance threshold (d3). When no adjacent vehicle is detected, the lane departure warning system is activated only when the host vehicle is actually crossing the lane boundary (i.e., d4=0).

Alternatively, in some constructions, the ECU 100 can utilize estimated distances between the host vehicle and the lane boundary to estimate a time to lane departure (e.g., based on a rate of change of the distance between the host vehicle and the lane boundary).

Thus, the invention provides, among other things, a lane departure monitoring system and method that monitors the lane position of the host vehicle and provides a warning to the user of the host vehicle based on a characterization of vehicles operating in adjacent lanes. Various features and advantages of the invention are set forth in the following claims.

What is claimed is:

1. A lane departure monitoring system comprising:
a first sensor positionable on a host vehicle with a field of view that includes a plurality of lane markings;
a second sensor positionable on the host vehicle with a field of view that includes at least a portion of a side blind-spot of the host vehicle; and
a control system including at least one processor and one memory, the memory storing instructions that, when executed by the processor, cause the control system to
receive a first signal from the first sensor indicative of a position of the lane markings relative to the host vehicle,
determine, based at least in part on the first signal, whether the host vehicle is likely to cross a lane boundary,
determine based on a second signal from the second sensor, whether a second vehicle is present in a lane adjacent to the host vehicle,
determine whether the second vehicle is a fast approaching vehicle based at least in part on the second signal, output an action signal at a first time when the host vehicle is likely to cross a lane boundary and the second vehicle is determined to be a fast approaching vehicle, output the action signal at a later time when the control system determines that the host vehicle is likely to cross a lane boundary and the second vehicle is determined to not be a fast approaching vehicle, wherein the action signal generates a lane departure warning for a user by generating an audible, visual, or haptic alert.

2. The system of claim 1, wherein the first sensor includes a forward-facing video camera and the second sensor includes a radar sensor.

3. The system of claim 1, wherein the instructions, when executed by the processor, further cause the control system to determine an estimated lane exit time indicative of a period of time until the host vehicle will likely cross a lane boundary, wherein the instructions, when executed by the processor, cause the control system to output the action signal at the first time by comparing the estimated lane exit time to a first time threshold and outputting the action signal when the estimated lane exit time is less than the first time threshold, wherein the instructions, when executed by the processor, cause the control system to output the action signal at the later time by comparing the estimated lane exit time to a second time threshold and outputting the action signal when the estimated lane exit time is less than the second time threshold, and wherein the second time threshold is less than the first time threshold.

4. The system of claim 3, wherein the instructions, when executed by the processor, further cause the control system to determine the estimated lane exit time based on the first sensor and a direction sensor.

5. The system of claim 1, wherein the instructions, when executed by the processor, further cause the control system to
determine a speed of the second vehicle based on the second signal,
determine a distance to the second vehicle based on the second signal, and
determine an estimated time-to-collision of the host vehicle with the second vehicle based on the speed and the distance.

6. The system of claim 5, wherein the instructions, when executed by the processor, cause the control system to determine that the second vehicle is a fast approaching vehicle when the estimated time-to-collision is below a first collision time threshold.

7. The system of claim 6, wherein the instructions, when executed by the processor, further cause the control system to determine that the second vehicle is a slow approaching vehicle when the estimated time-to-collision is above a second collision time threshold, and wherein the instructions, when executed by the processor, cause the control system to output the action signal at the later time by outputting the action signal at the later time when the host vehicle is likely to cross a lane boundary and the second vehicle is determined to be a slow approaching vehicle.

8. The system of claim 6, wherein the instructions, when executed by the processor, further cause the control system to determine that the second vehicle is a stagnating blind-spot vehicle when the second signal indicates that the second vehicle is present in the adjacent lane and that there is no immediate collision risk, and wherein the instructions, when executed by the processor, cause the control system to output the action signal at the later time by outputting the action signal at the later time when the host vehicle is likely to cross a lane boundary and the second vehicle is determined to be a stagnating blind-spot vehicle.

9. The system of claim 6, wherein the instructions, when executed by the processor, cause the control system to output the action signal at the later time by outputting the action signal at the later time when the host vehicle is likely to cross a lane boundary and the control system determines that there is no vehicle in the adjacent lane.

10. The system of claim 1, wherein the instructions, when executed by the processor, further cause the control system to
determine whether the second vehicle is a slow approaching vehicle based on the second signal;
determine whether the second vehicle is a stagnating blind-spot vehicle based on the second signal, the stagnating blind-spot vehicle being located at least partially in a side blind-spot of the host vehicle;
output the action signal at a second time when the host vehicle is likely to cross a lane boundary and the second vehicle is the slow approaching vehicle, wherein the second time is later than the first time; and
output the action signal at a third time when the host vehicle is likely to cross a lane boundary and the second vehicle is the stagnating blind-spot vehicle, wherein the third time is later than the second time,
wherein the instructions, when executed by the processor, further cause the control system to output the action signal at the later time by outputting the action signal at a fourth time when the host vehicle is likely to cross a lane boundary and the control system determines that there is no vehicle in the adjacent lane, wherein the later time is later than the third time.

11. The system of claim 1, wherein the instructions, when executed by the processor, further cause the control system to determine an estimated lane exit distance indicative of a distance in a direction of travel that the host vehicle will likely cross a lane boundary, wherein the instructions, when executed by the processor, cause the control system to output the action signal at the first time by comparing the estimated lane exit distance to a first distance threshold and outputting the action signal when the estimated lane exit distance is less than the first distance threshold, wherein the instructions, when executed by the processor, cause the control system to output the action signal at the later time by comparing the estimated lane exit distance to a second distance threshold and outputting the action signal when the estimated lane exit distance is less than the second distance threshold, and wherein the second distance threshold is less than the first distance threshold.

12. The system of claim 1, wherein the control system is further configured to:
determine whether a third vehicle is present in an adjacent lane to the host vehicle based on the first signal;
determine whether the third vehicle is approaching the host vehicle based on the first signal;
determine a distance between the third vehicle and the host vehicle;
determine a speed of the third vehicle; and
determine a time-to-collision between the host vehicle and the third vehicle based on the distance and the speed,
wherein the instructions, when executed by the processor, cause the control system to output the action signal at the first time when the host vehicle is likely to cross a lane boundary and the third vehicle is determined to be present and approaching.

13. The system of claim 1, wherein the control system is configured to activate a lane keeping support system in response to the action signal, wherein the lane keeping support system adjusts the operation of the host vehicle to prevent the host vehicle from crossing a lane boundary.

14. The system of claim 1, wherein the control system further includes an electronic control unit, a right rear sensor controller communicably coupled to the electronic control unit, and a left rear sensor controller communicably coupled to the electronic control unit, and wherein the right rear sensor controller is configured to
- detect the second vehicle operating in a right-side blind-spot of the host vehicle,
- transmit a blind-spot detection signal to the electronic control unit in response to detecting the second vehicle operating in the right-side blind-spot,
- determine a speed of the second vehicle relative to the host vehicle;
- determine a distance between the second vehicle and the host vehicle;
- determine an estimated time-to-collision between the host vehicle and the second vehicle based on the speed and distance; and
- transmit the estimated time-to-collision to the electronic control unit.

15. A lane departure monitoring method comprising:
- positioning a first sensor on a host vehicle with a field of view that includes a plurality of lane markings;
- positioning a second sensor on the host vehicle with a field of view that includes at least a portion of a side blind-spot of the host vehicle;
- receiving a first signal from the first sensor indicative of a position of the lane markings relative to the host vehicle;
- determining, based at least in part on the first signal, whether the host vehicle is likely to cross a lane boundary;
- determining based on a second signal from the second sensor, whether a second vehicle is present in a lane adjacent to the host vehicle;
- determining whether the second vehicle is a fast approaching vehicle based at least in part on the second signal,
- outputting an action signal at a first time when the host vehicle is likely to cross a lane boundary and the second vehicle is determined to be a fast approaching vehicle;
- outputting the action signal at a later time when the host vehicle is likely to cross a lane boundary and the second vehicle is determined to not be a fast approaching vehicle,
  - wherein the action signal generates a lane departure warning for a user by generating an audible, visual, or haptic alert.

16. The method of claim 15, further comprising:
- determining an estimated lane exit time indicative of a period of time until the host vehicle will likely cross a lane boundary,
- wherein outputting the action signal at the first time is performed by comparing the estimated lane exit time to a first time threshold and outputting the action signal when the estimated lane exit time is less than the first time threshold,
- wherein outputting the action signal at the later time is performed by comparing the estimated lane exit time to a second time threshold and outputting the action signal when the estimated lane exit time is less than the second time threshold, and
- wherein the second time threshold is less than the first time threshold.

17. The method of claim 15, further comprising: activating a lane keeping support system in response to the action signal, wherein the lane keeping support system adjusts the operation of the host vehicle to prevent the host vehicle from crossing a lane boundary.

\* \* \* \* \*